United States Patent [19]

Fayling

[11] 4,363,038
[45] Dec. 7, 1982

[54] CONTACT DUPLICATION SYSTEM USING ANISOTROPIC MAGNETIC RECORDING MEDIA

[75] Inventor: Richard E. Fayling, White Bear Lake, Minn.

[73] Assignee: Minnesota Mining and Manufacturing Company, Saint Paul, Minn.

[21] Appl. No.: 168,675

[22] Filed: Jul. 14, 1980

[51] Int. Cl.³ .......................... G11B 5/86; G11B 5/74; G06K 19/06
[52] U.S. Cl. ..................................... 360/17; 360/131; 235/493
[58] Field of Search ..................... 360/15, 16, 17, 131; 235/493, 449, 450

[56] References Cited

U.S. PATENT DOCUMENTS

| | | | |
|---|---|---|---|
| 2,738,383 | 3/1956 | Herr et al. | 179/100.2 |
| 3,982,276 | 9/1976 | Roos | 360/17 |
| 3,986,205 | 10/1976 | Fayling | 360/131 |
| 3,986,206 | 10/1976 | Fayling | 360/131 |
| 3,995,313 | 11/1976 | Fayling | 360/15 |

OTHER PUBLICATIONS

"Magnetic Tape Duplication by Contact Printing", by H. Sugaya and F. Kobayashi in vol. 189, Jan. 3, 1972 issue, Annals of N.Y. Academy of Sciences.
"Anisotropic Erasure and Demagnetization Characteristics of Recording Tapes Compressing Particles With Uniaxial Magnetocrystalline Anisotropy" by R. E. Fayling, in IEEE Transactions on Magnetics, vol. MAG-13, Sep. 1977.

Primary Examiner—Robert M. Kilgore
Attorney, Agent, or Firm—Cruzan Alexander; Donald M. Sell; William B. Barte

[57] ABSTRACT

A system for contact duplication is disclosed wherein anhysteretic magnetization of a copy medium occurs using an anisotropic master medium wherein the two media are held in surface contact and an AC bias magnetic field is applied along the hard axis of the master media.

15 Claims, 4 Drawing Figures

4,363,038

CONTACT DUPLICATION SYSTEM USING ANISOTROPIC MAGNETIC RECORDING MEDIA

BACKGROUND OF THE INVENTION

1. Field of the Invention

This invention relates to methods and systems for contact duplicating magnetic recordings such as those provided in magnetic recording disks, diskettes, and tapes and in particular to such methods and systems where anhysteretic contact duplication is effected.

2. Description of the Prior Art

Magnetic recording has traditionally been faced with the intrinsic inability of that recording concept to provide mass produced, inexpensive duplicates, such as are provided by stamped phonograph record replicas. In an attempt to at least approximate similar duplicates, various techniques for effecting the contact duplication of magnetic records have evolved. Generally, these techniques involve the common first step of placing a prerecorded master tape in surface contact with an unrecorded slave tape. In one approach, the contacted media are then heated to a temperature above the Curie temperature of the slave medium, but below the Curie temperature of the master medium, and the contacted media are then recooled while still in contact. In another approach more germane to the present invention, an AC bias magnetic field is applied to the contacted tapes to anhysteretically record on the slave medium the magnetic pattern previously recorded on the master medium.

As used above and throughout the present specification and claims, the expression "contacted media", and analogous varients thereof, refer to the master and slave media being in intimate surface contact, or in sufficiently close proximity that the local fields associated with a prerecorded pattern in the master medium are of sufficient intensity to contact duplicate the localized field patterns in the master medium onto the slave medium without appreciable divergence of the local field patterns and a resultant lowering of pattern resolution. For example, a thin polymeric web may be sandwiched between the "contacted media" and yet be within the subject definition. An excellent review of these techniques is presented in the article "Magnetic Tape Duplication by Contact Printing" by H. Sugaya and F. Kobayashi, Ann. N.Y. Acad. Sci., Vol. 189, pp. 214–238, Jan. 1972.

Magnetic recording media exhibiting exceptionally high uniaxial anisotropy are now becoming somewhat well known, at least in experimental form. Such media in particular may be provided by using magnetic materials possessing very high magnetocrystalline anisotropy. For example, Mr. R. E. Fayling, the present inventor has previously disclosed magnetic recording tapes made in a conventional manner using particulate barium ferrite and an organic binder, which tapes possess such uniaxial anistropy. See "Anisotropic Erasure and Demagnetization Characteristics of Recording Tapes Comprising Particles with Uniaxial Magnetocrystalline Anisotropy", IEEE Trans. on Mag., Vol. MAG-13, No. 5, pp. 1391–93 (Sept. 1977). In that article, the effect on erasure and demagnetization of such media resulting from the application of AC magnetic fields applied along both the easy axis of magnetization and along the hard axis was reported, it being noted that such tapes were more resistant to erasure or demagnetization when the fields were applied along the hard axis.

SUMMARY OF THE INVENTION

Despite the relatively long time that the concept of anhysteretic contact duplication has been known, together with the knowledge that a highly anisotropic recording medium may be prepared which is resistant to erasure or demagnetization when exposed to AC magnetic fields applied along a hard axis of magnetization, no one has heretofore recognized the particular suitability of such a medium as a master medium in a system wherein that property is utilized. Consistent with that recognition, therefore, the system of the present invention comprises the combination of such a master medium, means for impressing a magnetic record thereon, a slave medium, means for temporarily maintaining the two media in surface contact, and means for applying an AC bias magnetic field to the contacted media.

In particular, the master magnetic recording medium is characterized by an extent of magnetic anisotropy associated with at least one easy and one hard axis of magnetization such that when the medium is initially magnetized by the application of a substantially saturating magnetizing field applied along an easy axis of the medium to establish a remanent state therein, and the medium is then subjected to an AC magnetic field having an intensity equal to twice the easy axis coercive force of the medium applied parallel to a hard axis of the medium, the level of remanent magnetic moment along the easy direction will be at least 40% of the initial value of the remanent magnetic moment.

Further, means are included for impressing a magnetic recording pattern on the master recording medium in the form of localized magnetic field patterns therein. Likewise, the slave magnetic recording medium is capable of becoming remanently magnetized when an external magnetic field is impressed thereon.

In order to ensure that the magnetic field patterns in the master medium are copied onto the slave medium without appreciable loss in resolution, the system also includes means for temporarily maintaining the master and slave magnetic media in surface contact with substantially no relative movement therebetween, while the AC bias magnetic field is applied to the contacted media parallel to the hard axis of the master medium, to promote duplication of a magnetic pattern on the master media to the slave media without erasing the pattern on the master medium.

The process of creating the duplicate pattern as a result of the use of a bias field is well-known as anhysteretic magnetization. The bias field drives the magnetization of the copy medium around its hysteresis curve, and as the bias field decreases in amplitude, the local fields from the master medium are believed to orient the magnetic moments of the adjacent portions of the copy medium, thus forming the image pattern. For this duplication to succeed, the magnetization pattern on the master medium must resist erasure as a result of the AC bias field. As noted above, highly anisotropic master media are exceptionally resistant to erasure by hard axis bias fields.

By thus utilizing the highly anisotropic master media and appropriately applied bias fields pursuant to the present invention, the usual requirement reported by Sugaya (see reference noted above) that the coercive force of the master medium exceed that of the copy medium by a factor of 2-2.5 is eliminated.

DESCRIPTION OF THE PREFERRED EMBODIMENTS

Pursuant to the present invention, extreme anisotropic characteristics such as are manifested by a resistance to erasure and by marked differences in coercive force along an easy and along a hard axis of magnetization, are exploited in a contact duplication system. In the system, such properties may be provided by barium ferrite, cobalt iron phosphide or other highly anisotropic materials included in a recording media to permit anhysteretic contact duplication of a signal prerecorded on that medium onto a copy medium, the easy-axis coercive force ($H_c^e$) of which may be even higher than the easy-axis coercive force of the master medium. The use of bias fields applied along the hard axis of the master medium, the intensity of which fields may be up to three times the easy-axis coercive force of the master medium, and the use of copy media having easy-axis coercive forces larger than that of the master medium thus differ from the anhysteretic contact duplication conditions taught in U.S. Pat. No. 2,738,383 (Herr and Marchant) and from that taught in the review article of Sugaya and Kobayashi, noted above, which article reports an optimum ratio of easy-axis coercivity for the master tape to that of the copy tape of about 2.5.

Figure 1:
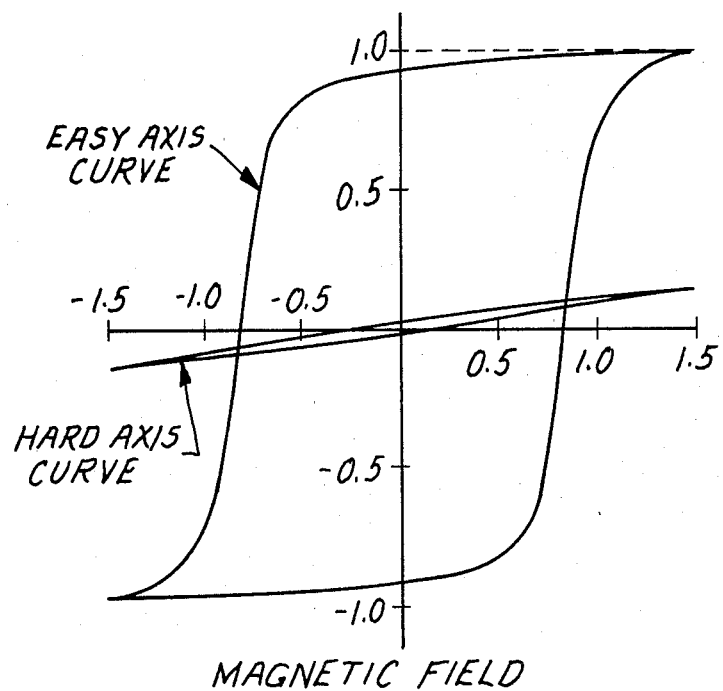
FIG. 1 is a graph showing the magnetic hysteresis characteristics of a typical master recording medium along easy and hard directions of magnetization, as utilized in the present invention.

In the aforementioned article of Mr. R. E. Fayling, the large direction dependence of magnetic properties and erasure characteristics of well-aligned barium ferrite tapes is attributed to the magnetization reversal characteristics of the hexagonal structured barium ferrite particles used in those tapes. It is there noted that easy-axis magnetic fields less than 2,000 Oe, such as are normally used in magnetic recording, are believed to nucleate or unpin a 180 degree domain wall as a mechanism of reversal of magnetization direction in low coercive force barium ferrite, thus resulting in hysteresis properties typical of magnetic recording media. In contrast, hard-axis magnetic fields of the same magnitude are believed to cause a small coherent rotation of the magnetization, resulting in a nearly reversible linear dependence of magnetization on magnetic fields applied along the hard axis direction. FIG. 1 shows representative easy-axis and hard-axis curves for a well-oriented representative barium ferrite tape. As is there shown, the hard-axis curve shows very little hysteresis, a 1500 Oersted applied field producing only about 15% of the magnetization level produced by a 1500 Oersted easy-axis magnetic field. It is now appreciated that such a barium ferrite tape will be relatively unresponsive to either recording or erasure by magnetic fields applied along the hard axis.

In contrast to such highly anisotropic media, the hard-axis magnetization versus applied magnetic field characteristics for a well-aligned conventional magnetic recording tape, such as that formed from cobalt doped gamma $Fe_2O_3$, exhibit considerably more hysteresis. A similar 1500 Oe field applied along a hard-axis of such a conventional medium will produce greater than 70% of the magnetization level produced by a similar magnetic field applied along the easy-axis of such a medium. This difference in the response to the two media to magnetic fields applied along the hard-axis of the highly anisotropic medium has now been utilized, in that it has been found that a premagnetized barium ferrite medium will resist erasure by a high enough level of AC bias field to stimulate anhysteretic contact duplication in a conventional copy medium.

Figure 2:
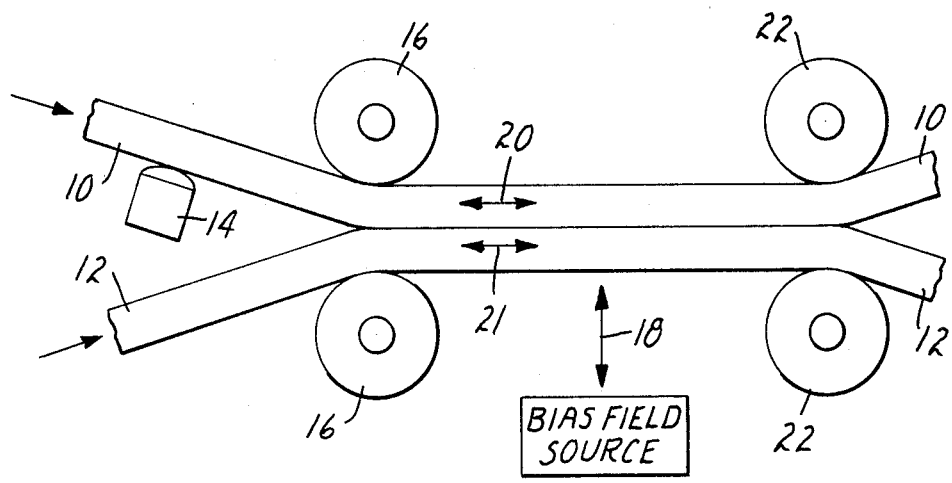
FIG. 2 is a stylized cross-section of one embodiment of the present invention.

FIG. 2 shows a stylized cross-sectional view of a system pursuant to the present invention by which such anhysteretic contact duplication may be achieved. As is there set forth, the system include a master magnetic recording tape 10 and a copy tape 12, together with means, such as a conventional recording head 14 for impressing a localized magnetic field pattern upon the master recording medium 10. The two types are then brought into surface contact by means of the rollers 16 and 22, and an AC bias magnetic field applied to the contacted media via the field source 18. In the embodiment shown in FIG. 2, the easy-axes of magnetization of the master tape 10 and that of the copy tape 12 are shown to be in the plane of the media and parallel to the length thereof as shown by the arrows 20 and 21. The magnetic properties of exemplary magnetic tapes utilized in the present invention are listed in Table 1 tapes 1 through 3 being representative of highly anisotropic master media, and tapes 4 through 7 being representative of conventional copy media. The magnetic particles used in tapes 1 through 7 were magnetically aligned during coating to produce a single, easy-axis of magnetization parallel to the long dimension, i.e. the longitudinal axis of the tape.

TABLE 1

| Magnetic Properties of Recording Tapes | | | | |
|---|---|---|---|---|
| Tape | Magnetic Material | $H_c^e$(Oe) | Br(G) | $Br/B_{3kOe}$ | Coating Thickness (μm) |
| 1 | Barium Ferrite | 715 | 990 | 0.90 | 8.4 |
| 2 | Barium Ferrite | 960 | 940 | 0.95 | 23.6 |
| 3 | Barium Ferrite | 975 | 1030 | 0.95 | 14.5 |
| 4 | $\gamma$-$Fe_2O_3$ | 290 | 920 | 0.75 | 10.2 |
| 5 | $CrO_2$ | 555 | 1210 | 0.91 | 4.8 |
| 6 | Co—$\gamma$-$Fe_2O_3$ | 875 | 1270 | 0.77 | 8.9 |
| 7 | Co—$\gamma$-$Fe_2O_3$ | 1025 | 980 | 0.83 | 7.7 |

In tests demonstrating the utility of the tapes 1 through 3 as a master tape pursuant to the present invention, the master tapes were initially "saturation" recorded with an isolated pulse signal at a density of 27 flux transitions/cm, using a 12.7 micrometer gap length, 6.4 mm track width, mumetal core head (Nortronics Model DQ 11F), driven by a 1 kHz, 150 mA square-wave signal, at a tape speed of 0.75 m/s.

The recorded master tapes and an erased copy tape, such as one of the tapes 4 through 7 noted in the Table above, were then positioned with their magnetic coated surfaces in intimate surface contact and a uniform AC magnetic bias field was supplied along a hard-axis of magnetization of the contacted tapes. Such a hard-axis field may thus be applied perpendicular to the plane of the tapes as designated by the arrow 18 in FIG. 2 or may be applied in the plane of the tapes but perpendicular to the longitudinal direction thereof. The AC bias field was then slowly reduced to zero amplitude prior to separating the contacted tapes, thus enhancing the conditions for anhysteretic contact duplication, and assuring that the bias field had no easy-axis component. The signal amplitude of both the copy and master tapes was then tested to determine the level of signal anhysteretically induced into the copy tape and to determine the level of signal retained within the master tape after subjecting it to the hard-axis bias field. For comparison purposes, the copy tapes were subsequently re-recorded with a 1 kHz square wave signal using the same equipment and conditions previously used to record the master tape. The signal amplitude values were fairly reproducible, although some variation was found to result from differences in head-to-tape contact during recording and in tape-to-tape contact during the contact duplication process, and other variable factors. Results from a series of anhysteretic contact duplication tests using different combinations of master tape, copy tape, and hard-axis bias field, are shown in Tables 2 through 5 below. Each Table includes for each test, the easy-axis coercive force for both the master and the copy tape, the maximum bias field amplitude, the copy tape signal amplitudes, both resulting after contact duplication and as subsequently directly recorded, and the master tape signal amplitudes as initially recorded and as remaining after the application of the hard-axis bias field.

Most of the tests noted below utilize bias fields applied along the transverse in-plane axis of the contacted master and copy tapes. Thus, for example, the test data in Table 2 below provides a comparison between the performance of conventional easy-axis bias and hard-axis bias contact duplication, using the master tape No. 2 in contact with the copy tape No. 4, together with a 500 Oe bias field. The first test shown in Table 2 was performed utilizing the preferred conditions suggested in the Sugaya et al review paper acknowledged above for providing anhysteretic contact duplication utilizing previously known techniques, i.e. that of applying a stimulating bias field along an easy axis of the master medium. As shown in the second test in Table 2, when an identical intensity field was applied along the hard axis of the master media, improved anhysteretic contact duplication results were nonetheless obtained.

TABLE 2

| $H_c^e$(Oe) | | Bias Field | Copy Tape Signal ($V_{p-p}$) | | Master Tape Signal ($V_{p-p}$) | |
|---|---|---|---|---|---|---|
| Master | Copy | (Oe) | Copied | Recorded | Initial | After Copying |
| 960 | 290 | 500(E) | 1.9 | 2.7 | 5.5 | 4.8 |
| 960 | 290 | 500 | 2.1 | 2.7 | 5.4 | 5.2 |

Table No. 3 sets forth typical results obtained with the use of hard-axis bias fields having amplitudes considerably larger than the easy-axis coercive force of the master tape. Hard-axis bias field amplitudes two to three times the easy-axis coercive force of the master tape were found to result in only ten to twenty-five percent reductions in the recorded signal amplitude in the master media after copying. Under subsequent repeated contact duplication tests using the same conditions, no significant further reduction on the master tape signal was observed. Hard-axis bias fields of such magnitudes have been found to be normally sufficient to drive the copy tapes, even those having a larger easy-axis coercive force than that of the master tape around a hard-axis hysteresis curve, thus providing the necessary conditions for anhysteretic contact duplication.

TABLE 3

| $H_c^e$(Oe) | | Bias Field | Copy Tape Signal ($V_{p-p}$) | | Master Tape Signal ($V_{p-p}$) | |
|---|---|---|---|---|---|---|
| Master | Copy | (Oe) | Copied | Recorded | Initial | After Copying |
| 715 | 290 | 1500 | 1.6 | 2.7 | 3.1 | 2.8 |
| 960 | 875 | 2000 | 2.2 | 4.5 | 5.3 | 4.5 |
| 980 | 555 | 2000 | 0.42 | 0.79 | 4.6 | 3.9 |

It may also be noted that the intensity of the copied tape signal in all the tests within Table 3 was on the order of 50% that obtained upon direct re-recording of the same signal in the copy media, thereby demonstrating that significant signals could be contact duplicated even under such high bias field conditions.

A further shown in Table 4, a number of tests have been performed in which signals were anhysteretically contact duplicated onto a copy tape having a higher easy-axis coercive force than that of the master tape. It is significant that even under such conditions, which are totally unsuggested by any prior art reference, signal amplitudes were obtained upon contact duplication which were nonetheless readily detectable, even though the amplitudes were appreciably less than the obtainable by direct recording processes.

TABLE 4

| $H_c^e$(Oe) | | Bias Field | Copy Tape Signal ($V_{p-p}$) | | Master Tape Signal ($V_{p-p}$) | |
|---|---|---|---|---|---|---|
| Master | Copy | (Oe) | Copied | Recorded | Initial | After Copying |
| 715 | 1025 | 1500 | 0.13 | 0.64 | 3.1 | 2.7 |
| 715 | 1130 | 1500 | 0.21 | 1.06 | 3.0 | 2.7 |
| 960 | 1025 | 1500 | 0.26 | 0.64 | 5.3 | 5.0 |
| 960 | 1130 | 1500 | 0.28 | 1.05 | 5.3 | 4.9 |
| 980 | 1130 | 2000 | .24 | 1.1 | 4.6 | 3.9 |

That the copy signal amplitudes in all of the tests are lower than that for comparable signals directly recorded on the same tape with a record head as shown by the data in Tables 2 through 4, is not surprising. As further shown in Table 5, the copy signal amplitudes were found to reach a maximum percentage of the subsequently re-recorded signal when the bias field amplitudes were equal to 1.2 to 1.5 times the easy-axis coercive force of the copy tape, and to decrease gradually as the intensity of the bias field increases so as to reduce the amplitude of the master tape signal.

TABLE 5

| $H_c^e$(Oe) | | Bias Field | Copy Tape Signal ($V_{p-p}$) | | Master Tape Signal ($V_{p-p}$) | |
|---|---|---|---|---|---|---|
| Master | Copy | (Oe) | Copied | Recorded | Initial | After Copying |
| 715 | 1025 | 500 | 0.01 | 0.64 | 3.0 | 3.0 |
| 715 | 1025 | 1000 | 0.1 | 0.64 | 3.0 | 2.8 |
| 715 | 1025 | 1500 | 0.13 | 0.64 | 3.1 | 2.7 |
| 715 | 1025 | 2000 | 0.12 | 0.64 | 3.1 | 2.3 |

Figure 3:
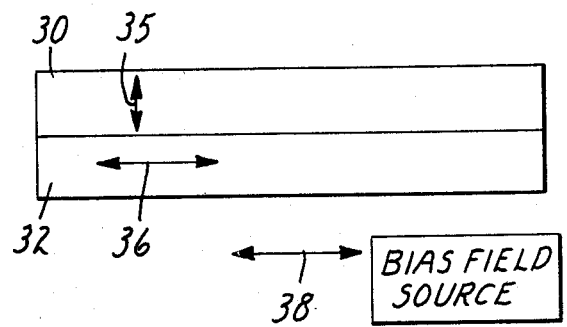
FIGS. 3 and 4 are stylized cross sections of other embodiments of the present invention employing different combinations of media having easy axes of magnetization in given directions, together with bias fields in other directions.

FIG. 3 sets forth a further embodiment of the present invention wherein a master medium 30 is shown in surface contact with a copy medium 32. In this embodiment, the easy axis of magnetization of the master medium 30 is shown to be normal to the surface of that medium as shown by arrow 35, while the easy-axis of magnetization of the copy medium 32 is shown to be in the plane of the medium as shown by arrow 36. In such an embodiment, the bias field is shown to be applied in the same direction as the easy-axis of magnetization of the copy medium as shown by the arrow 38, and which is therefore along a hard axis of magnetization of the master medium 30. Such as construction of the master medium may be desirably formed by coating particulate barium ferrite platelets such that the plane of the platelets lies in the plane of the medium, thereby resulting in the easy axis of magnetization, which is perpendicular to the plane of the platelets, lying perpendicular to the plane of the medium. A similar result may be obtained utilizing thin film magnetic constructions. Such an orientation of the easy axis of magnetization as shown by the arrow 35 is particularly desirable in that the lines of flux resulting from digitally recorded patterns in the master medium are predominantly in the plane of the copy medium and thus promote anhysteretic contact duplication in the plane of the copy medium as shown by the arrow 36.

Figure 4:
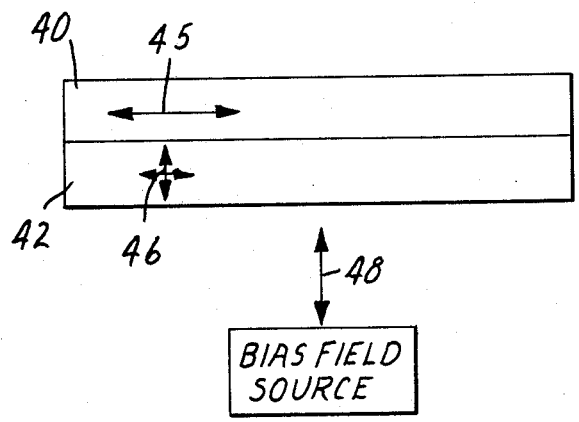

In a further embodiment shown in FIG. 4, the master medium 40 is shown to be in surface contact with the copy medium 42. In this embodiment, the easy axis of magnetization of the master medium 40 is shown to be in the plane of the medium as indicated by arrow 45. In contrast, the copy medium 42 is shown to have more than one easy axis of magnetization lying both in the plane of the medium and perpendicular to the plane of the medium as shown by arrows 46. Such a construction may readily be provided by not aligning the magnetic particles during the coating process, and is for example, provided in the conventional diskette type media. In such an embodiment, a bias magnetic field will be nonetheless applied perpendicular to the easy axis 45 of the master media 40 such as shown by arrow 48.

In the examples above, an AC bias magnetic field has been said to be applied to the contacted media and may preferably be applied in the form of a readily obtained 60 hertz alternating field. It is further within the scope of the present invention that such an AC field may be provided over widely varying frequencies of operation or by spatially varying fields which move relative to the contacted media.

The master media set forth in the Examples shown in Tables 1-5 above are further characterized by being highly resistent to demagnetization by fields applied along the hard axis. That property is best defined by a set of test conditions in which the media is first subjected to a DC magnetizing field applied along the easy axis of magnetization such that an initial remanent state results therein. As shown in Table 1, the master media (tapes Nos. 1-3) were observed to retain 90, 95 and 95% respectively of the maximum magnetization induced by a 3000 Oe applied field. Subsequently, a 60 Hz AC field was applied in steps of increasing intensity along the hard axis. When the intensity was equal to twice the easy axis coercive force the remanent state of each tape was observed to be 88, 96 and 96% respectively of the initial remanent states. In other tests utilizing a test tape prepared from iron cobalt phosphide particles, a reduced remanence approximately 90% was found to remain after such demagnetization conditions were applied.

While the barium ferrite tapes 1-3 noted above have been shown to retain 88-96% of this initial residual magnetic moment under the demagnetization conditions here set forth, the conventional tapes 4-7 were found to retain less than 25% of their initial residual magnetic moment after being subjected to similar conditions.

In general, it has been found that when the master media exhibits a remanent magnetization of less than approximately 40% of the initial remanent magnetization when demagnetized under conditions such as those noted above, that insufficient fields are retained for subsequent contact duplication operations.

I claim:
1. A signal duplicating system comprising:
  (a) a master magnetic recording medium having magnetic anisotropy associated with at least one easy and one hard axis of magnetization, said medium being characterized by an initial remanent magnetic moment after a substantially saturating magnetizing field is applied along an easy axis of said medium, and being further characterized by a subsequent remanent magnetic moment of at least 40% of said initial remanent magnetic moment after an AC magnetic field having an intensity equal to twice the easy axis coercive force of said master medium is applied parallel to a hard axis of the medium;
  (b) means for impressing a magnetic recording pattern on said master recording medium in the form of a localized magnetic field pattern therein;
  (c) a slave magnetic recording medium capable of becoming remanently magetized when an external magnetic field is impressed thereon;
  (d) means for temporarily maintaining said master and slave magnetic media in surface contact with substantially no relative movement therebetween; and
  (e) means for applying an AC bias magnetic field to the contacted media parallel to said hard axis of said master medium to promote duplication of a magnetic pattern on said master media to said slave media without erasing said pattern on said master medium.

2. A system according to claim 1 further comprising means for applying a said AC bias magnetic field along the direction of said hard axis of magnetization of said master medium and having a peak intensity greater than the easy axis coercive force of said master medium.

3. A system according to claim 2, comprising said copy medium having a coercive force greater than the easy axis coercive force of said master medium.

4. A system according to claim 1, further comprising
  (f) means for separating said master and slave media after the magnitude of said bias field is reduced to a negligible value at the point of separation.

5. A system according to claim 1, further comprising a slave recording medium having magnetic anisotropy associated with at least one easy and one hard axis of magnetization and means for maintaining said master and slave media in surface contact such that said bias field is applied parallel to the hard axis of the master medium and parallel to the easy axis of the slave medium.

6. A system according to claim 1, comprising a substantially planar sheet-like master medium having an easy axis of magnetization parallel to the plane thereof and a hard axis perpendicular thereto, and means for applying said bias field perpendicular to the plane thereof.

7. A system according to claim 1, comprising a substantially planar sheet-like master medium having an easy axis of magnetization parallel to the plane thereof and extending in a given direction in that plane and having a hard axis of magnetization also parallel to the plane but extending in a direction in that plane at an approximately 90° angle from said given direction, and means for applying said bias field parallel to said plane and parallel to the hard axis of said master medium.

8. A system according to claim 1, comprising a substantially planar sheet-like master medium having an easy axis of magnetization perpendicular to the plane of said medium, and having a hard axis of magnetization parallel to said plane, and means for magnetically applying said bias field parallel to said plane.

9. A system according to claim 1, comprising a substantially planar sheet-like master medium having an easy axis of magnetization parallel to said plane, a substantially planar sheet-like slave medium having an easy axis of magnetization perpendicular to the common plane of the contacted media.

10. A system according to claim 1, comprising said master and slave media in substantially disc-like configurations, and means for impressing said recording pattern on said master disc medium in circular tracks.

11. A system according to claim 10, comprising said master disc medium having an easy axis of magnetization parallel to an intended direction of rotation of said master disc medium.

12. A system according to claim 11, comprising said slave disc medium having an easy axis of magnetization parallel to an intended diretion of rotation of said slave disc medium.

13. A system according to claim 10, comprising said master disc medium having an easy axis of magnetization perpendicular to the plane of said master disc medium.

14. A signal duplicating method comprising:
 (a) providing a master magnetic recording medium having magnetic anisotropy associated with at least one easy and one hard axis of magnetization, said medium being characterized by an initial remanent magnetic moment after a substantially saturating magnetizing field is applied along an easy axis of said medium to establish a remanent state therein, and being further characterized by a subsequent remanent magnetic moment of at least 40% of said initial remanent magnetic moment after an AC magnetic field having an intensity equal to twice the easy axis coercive force of said master medium is applied parallel to a hard axis of the medium;
 (b) impressing a magnetic recording pattern on said master recording medium in the form of a localized magnetic field patterns therein;
 (c) providing a slave magnetic recording medium capable of becoming remanently magnetized when an external magnetic field is impressed thereon;
 (d) temporarily maintaining said master and slave magnetic media in surface contact with substantially no relative movement therebetween; and
 (e) applying an AC bias magnetic field to the contacted media parallel to said hard axis of said master medium to promote duplication of a magnetic pattern on said master media to said slave media without erasing said pattern on said master medium.

15. A signal duplicating method according to claim 14 comprising the additional step of:
 (f) separating said master and slave media after the magnitude of said bias field is reduced to a negligible value at the point of separation.

* * * * *